(12) United States Patent
Lee et al.

(10) Patent No.: US 11,059,107 B2
(45) Date of Patent: Jul. 13, 2021

(54) JIG DEVICE FOR PROCESSING OF DENTAL IMPLANT SURGICAL GUIDE

(71) Applicant: IMSOL CORP., Gyeonggi-do (KR)

(72) Inventors: Yun Ho Lee, Gyeonggi-do (KR); Da Som Heo, Gyeonggi-do (KR); Heui Jung Yang, Gyeonggi-do (KR)

(73) Assignee: IMSOL CORP., Gyeonggi-do (KR)

( * ) Notice: Subject to any disclaimer, the term of this patent is extended or adjusted under 35 U.S.C. 154(b) by 0 days.

(21) Appl. No.: 16/779,457

(22) Filed: Jan. 31, 2020

(65) Prior Publication Data
US 2021/0086271 A1 Mar. 25, 2021

(30) Foreign Application Priority Data

Sep. 19, 2019 (KR) .......................... 10-2019-0115153

(51) Int. Cl.
*B23B 47/28* (2006.01)
*A61C 1/08* (2006.01)

(52) U.S. Cl.
CPC .............. *B23B 47/28* (2013.01); *A61C 1/084* (2013.01); *B23B 2247/12* (2013.01)

(58) Field of Classification Search
CPC ...... B23B 47/28; B23B 2247/12; A61C 1/084
See application file for complete search history.

(56) References Cited

U.S. PATENT DOCUMENTS

| 4,601,618 A | * | 7/1986 | McEldowney | ......... | B23B 47/28 408/1 R |
|---|---|---|---|---|---|
| 5,927,982 A | * | 7/1999 | Kruger | ................... | A61C 1/084 433/213 |
| 5,989,025 A | * | 11/1999 | Conley | ................ | A61B 17/176 408/241 B |
| 8,043,091 B2 | * | 10/2011 | Schmitt | ................ | A61C 9/0046 433/196 |
| 8,348,669 B1 | * | 1/2013 | Schmitt | ................ | A61C 9/0046 433/213 |
| 9,378,308 B2 | * | 6/2016 | Pieper | ................ | A61C 13/0004 |
| 9,925,018 B2 | * | 3/2018 | Abboud | ................. | A61C 1/084 |
| 10,610,381 B2 | * | 4/2020 | Winslow | ................ | A61F 2/4081 |
| 2017/0079744 A1 | * | 3/2017 | Scheffer | ................. | A61C 1/085 |

* cited by examiner

*Primary Examiner* — Eric A. Gates
(74) *Attorney, Agent, or Firm* — Adsero IP

(57) ABSTRACT

There is disclosed a jig device that can be used for processing a dental implant surgical guide. According to an aspect of the invention, there is provided a jig device for processing of a dental surgical guide, the jig device including: a base at which a surgical guide having an impression acquired in an oral cavity of a patient is disposed; a fixing unit which is provided at the base and at which one side of the surgical guide is seated; and a cover unit which allows the surgical guide to be disposed between the fixing unit and the cover unit and is formed to be openable and closeable so as to fix and/or unfix the surgical guide.

17 Claims, 16 Drawing Sheets

JIG DEVICE FOR PROCESSING OF DENTAL IMPLANT SURGICAL GUIDE

CROSS-REFERENCE TO RELATED APPLICATIONS

This application claims priority to and the benefit of Korean Patent Application No. 10-2019-0115153 filed on Sep. 19, 2019, the disclosure of which is incorporated herein by reference in its entirety.

BACKGROUND OF THE INVENTION

Field of the Invention

The present invention relates to a jig device that can be used for processing a dental implant surgical guide.

Description of the Related Art

A dental implant operation includes processes of forming a placement hole in an alveolar bone and placing an implant fixture into the placement hole. An operation of the placement hole can be performed by a predetermined drilling unit depending on a position, a size, an angle, a depth, or the like designed in advance. A predetermined guide unit can be used for operating (drilling) the placement hole. The guide unit is usually referred to as a surgical guide or the like and is commonly referred to as the surgical guide in this specification, for convenience.

There are various examples of surgical guides, and there is, as an example thereof, a surgical guide disclosed in Korean Patent Application No. 10-2019-0055759 (Patent Literature 1) by the present applicant. Patent Literature 1 achieves effects of a reduction in an operation time, improvement in a matching degree, etc. by newly improving a method for manufacturing or operating a surgical guide or the like in the related art. The surgical guide disclosed in Patent Literature 1 or the like can be removed from an inside of an oral cavity of a patient and then can be subjected to a process of guide hole machining. The guide hole is formed for an operation of the placement hole and can be processed in a surgical guide depending on a position, a size, an angle, a depth, or the like designed in advance.

SUMMARY OF THE INVENTION

Examples of the invention aim to provide a jig device that can effectively mount and support a surgical guide on a drilling machine or the like, in order to perform guide hole machining.

According to an aspect of the invention, there can be provided a jig device for processing of a dental implant surgical guide, the jig device including: a base at which a surgical guide having an impression acquired in an oral cavity of a patient is disposed; a fixing unit which is provided at the base and at which one side of the surgical guide is seated; and a cover unit which allows the surgical guide to be disposed between the fixing unit and the cover unit and is formed to be openable and closeable so as to fix and/or unfix the surgical guide.

BRIEF DESCRIPTION OF THE DRAWINGS

FIG. 4 is a plan view schematically illustrating types of surgical guides;

FIG. 5 is a plane view schematically illustrating states where the surgical guides illustrated in FIG. 4 are disposed at the jig device illustrated in FIG. 1;

DETAILED DESCRIPTION OF THE PREFERRED EMBODIMENTS

Hereinafter, examples of the invention will be described with reference to the accompanying drawings. Note that the following examples are provided for easy understanding of the invention, and the scope of the invention is not limited to the following examples. The following examples are provided for a more complete description of the invention to a person of ordinary knowledge in this technical field, and thus a detailed description of a known configuration which is determined to unnecessarily obscure the technical gist of the invention is omitted.

Figure 1:
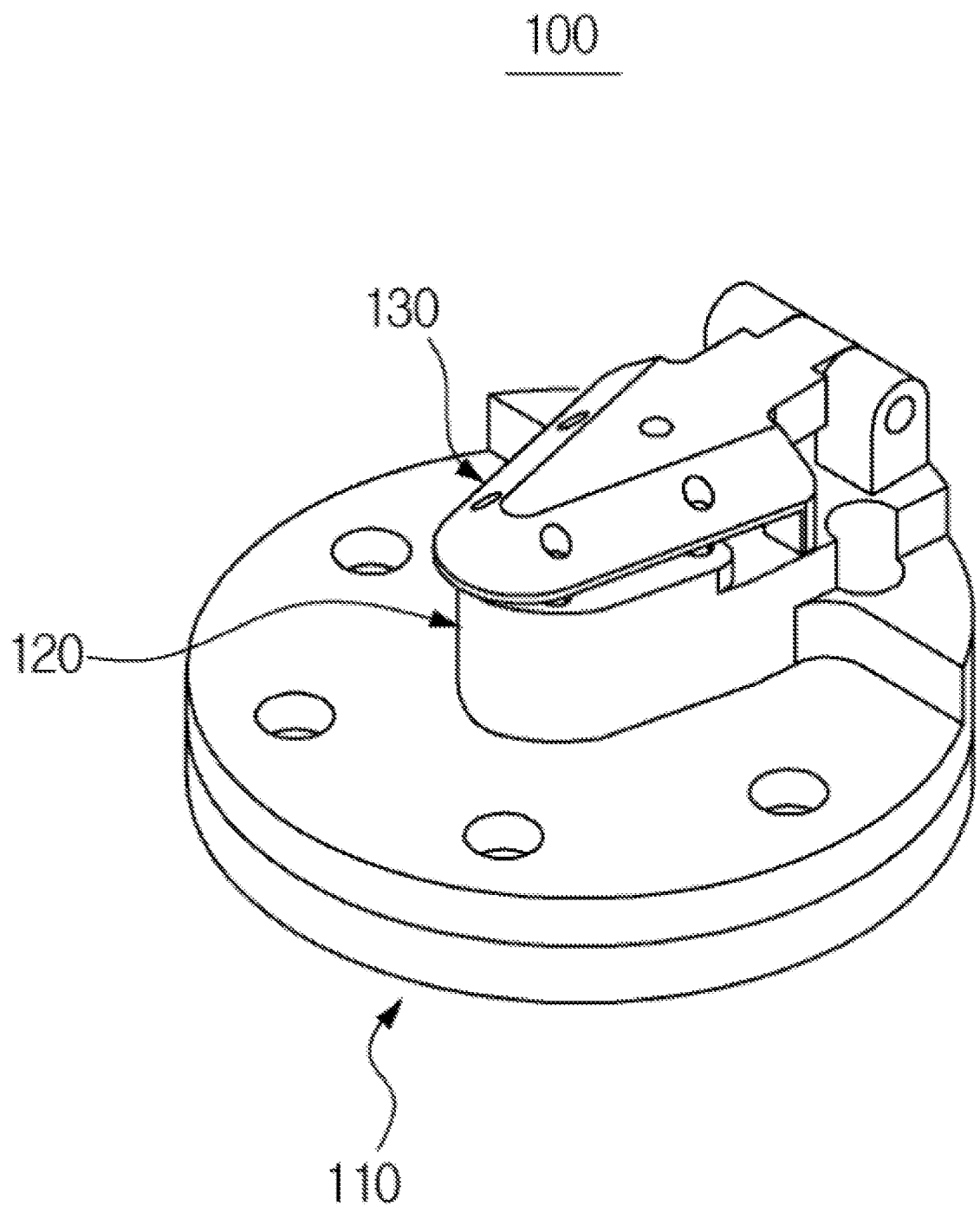
FIG. 1 is a perspective view of a jig device according to a first example of the invention.
Figure 2:
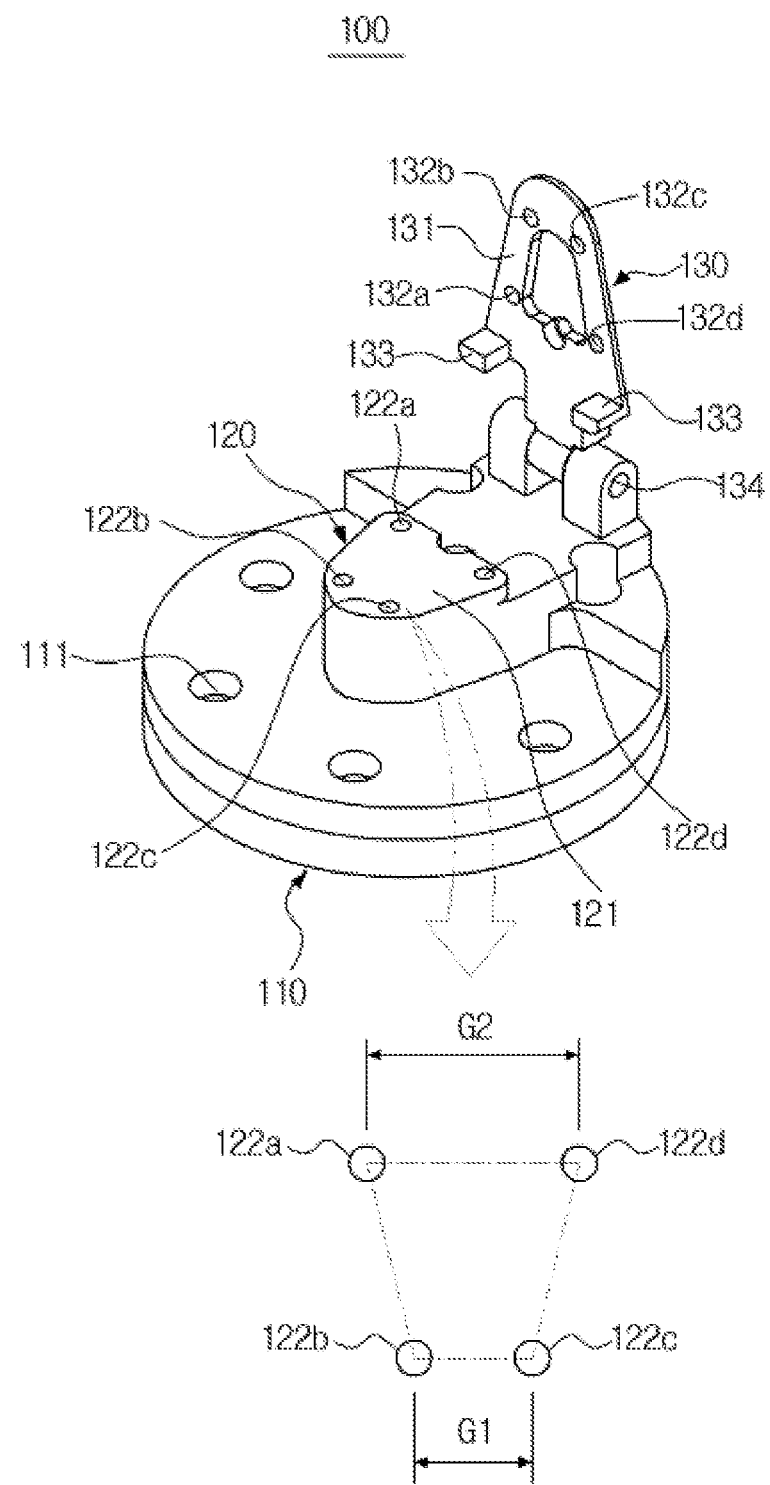
FIG. 2 is a perspective view illustrating an operation state of the jig device illustrated in FIG. 1.
Figure 3:
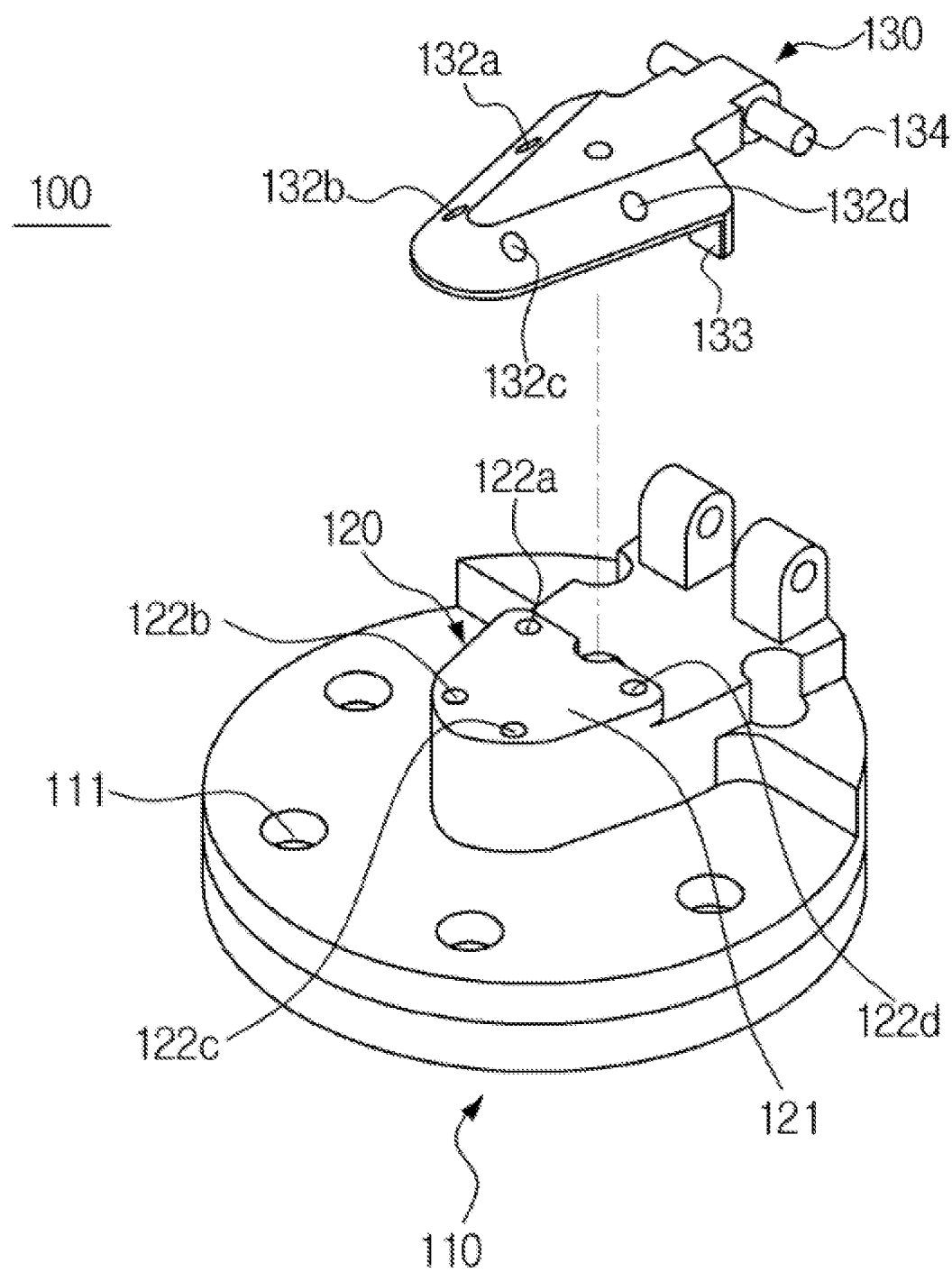
FIG. 3 is an exploded perspective view of the jig device illustrated in FIG. 1.
Figure 4A:
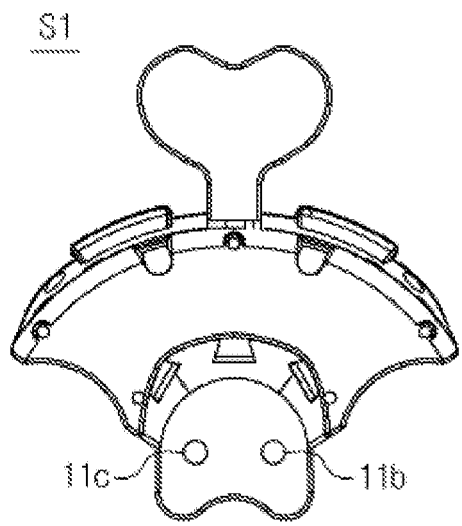
FIG. 4A illustrates an example of a first surgical guide formed to be extended into a partial arch shape.
Figure 4B:
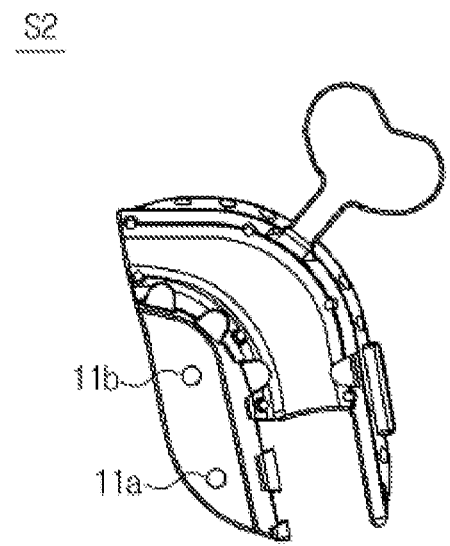
FIG. 4B illustrates an example of a second surgical guide formed to be extended into a half arch shape.
Figure 4C:
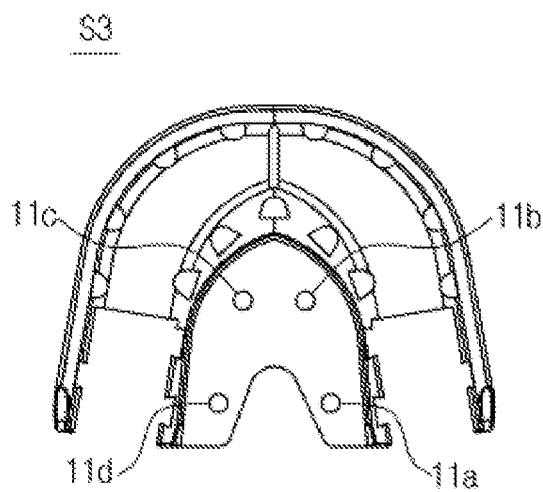
FIG. 4C illustrates an example of a third surgical guide formed to be extended into a full arch shape.
Figure 4D:
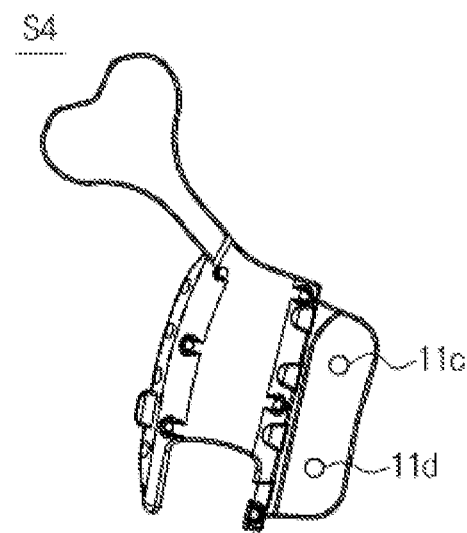
FIG. 4D illustrates an example of a fourth surgical guide having a linear shape.
Figure 5A:
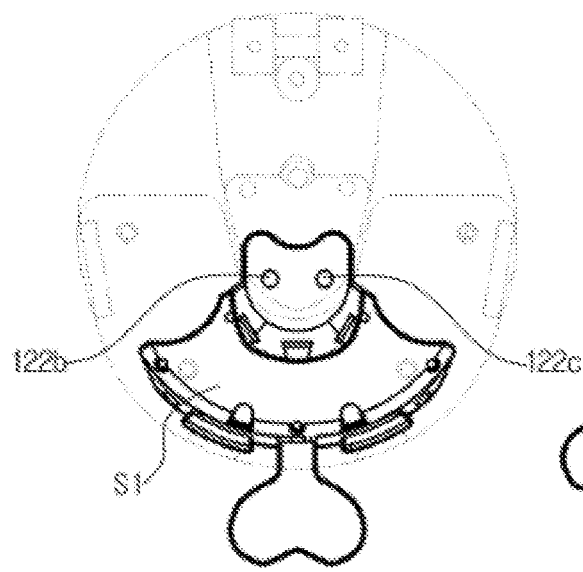
FIG. 5A is a plane view schematically illustrating states where the surgical guides illustrated in FIG. 4A are disposed at the jig device illustrated in FIG. 1.
Figure 5B:
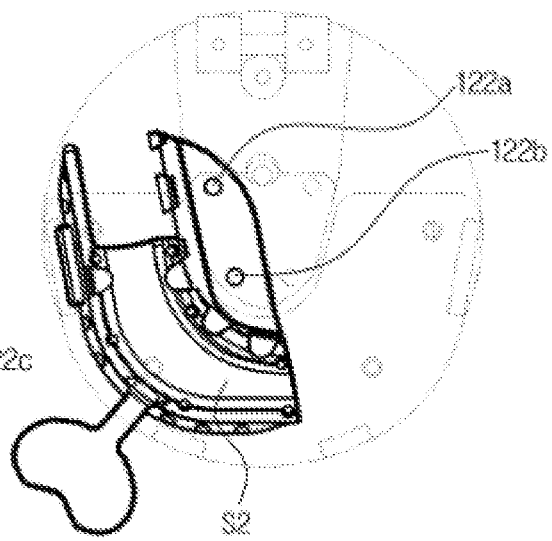
FIG. 5B is a plane view schematically illustrating states where the surgical guides illustrated in FIG. 4B are disposed at the jig device illustrated in FIG. 1.
Figure 5C:
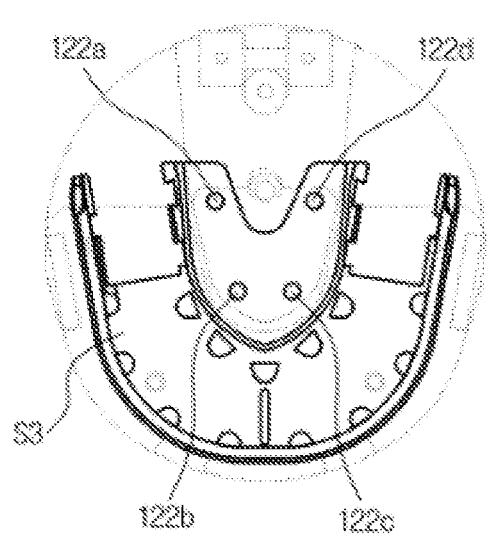
FIG. 5C is a plane view schematically illustrating states where the surgical guides illustrated in FIG. 4C are disposed at the jig device illustrated in FIG. 1.
Figure 5D:
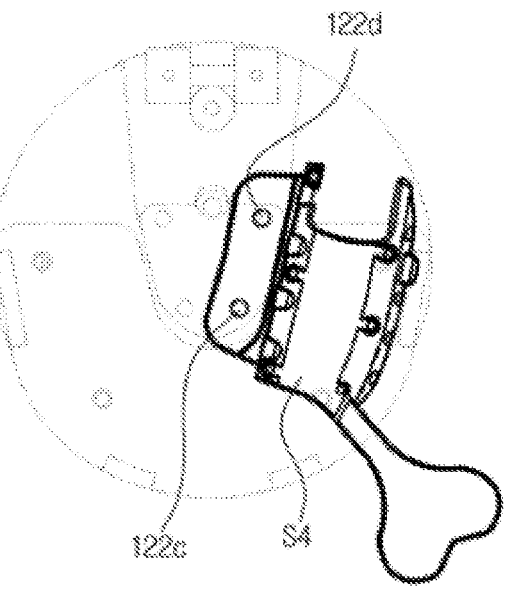
FIG. 5D is a plane view schematically illustrating states where the surgical guides illustrated in FIG. 4D are disposed at the jig device illustrated in FIG. 1.

FIGS. 1 to 3 illustrate a jig device according to a first example of the invention.

With reference to FIGS. 1 to 3, a jig device 100 of this example may include a base 110.

The base 110 may be formed into a plate form having a predetermined width and shape. In a case of this example, a substantially disk-shaped base 110 is illustrated.

The base 110 can be mounted and supported on a processing device for processing a surgical guide. For example, the base 110 can be mounted on a drilling machine for performing guide hole machining on the surgical guide. In order to be mounted on the processing device or the like, the base 110 can have one or more mounting holes 111.

On the other hand, the jig device 100 of this example can include a fixing unit 120.

The fixing unit 120 is provided to fix and support the surgical guide and thus may be provided on a top surface of the base 110. The fixing unit 120 may be formed to project by a predetermined extent from the top surface of the base 110, with consideration for a shape, a height, or the like of the surgical guide. Otherwise, the fixing unit 120 may be formed into a block form having a predetermined shape disposed on the top surface of the base 110.

Preferably, the fixing unit 120 may be disposed at a central part of the top surface of the base 110. This can ensure a sufficient mounting space for the surgical guide.

The fixing unit 120 may have a top surface 121 at which the surgical guide is disposed. The surgical guide may be seated and disposed at the top surface 121, and thus the surface is set to be referred to as a "seating surface 121", for convenience. The seating surface 121 may be formed into a flat surface having a predetermined width. As necessary, the seating surface 121 may have a predetermined shape, inclination, quality of material, or the like, in order to more stably fix or support the surgical guide.

The fixing unit 120 may have one or more guide coupling portions 122a to 122d. The guide coupling portions 122a to 122d may be disposed at the seating surface 121. The guide coupling portions 122a to 122d may guide the surgical guide to a mounting position and may partially aid in a fixing force.

A plurality of guide coupling portions 122a to 122d may be provided. In the case of this example, a case of providing four guide coupling portions 122a to 122d is illustrated. This is a result from consideration of guiding and stable fixing of the surgical guide to a mounting position.

As necessary, the four or more guide coupling portions 122a to 122d which are illustrated may be provided, or the four or less guide coupling portions may be provided. In this case, the plurality of guide coupling portions 122a to 122d may be disposed in a bilaterally symmetrical shape. In addition, when the four or more guide coupling portions 122a to 122d are provided, the guide coupling portions 122a to 122d disposed at the outermost side can be disposed similarly to first to fourth guide coupling portions 122a to 122d to be described below.

The guide coupling portions 122a to 122d may be formed to have a structure, a shape, or the like such as a hole, a groove, or a protrusion which can be mechanically coupled to the surgical guide. In the case of this example, the guide coupling portions 122a to 122d are illustrated to have a groove form having a predetermined depth, the groove being formed to be extended in a vertical direction at the fixing unit 120. Fixing means such as a pin or a bar can be fastened to the guide coupling portions 122a to 122d such that the surgical guide can be mechanically fixed and coupled thereto.

Figure 6:
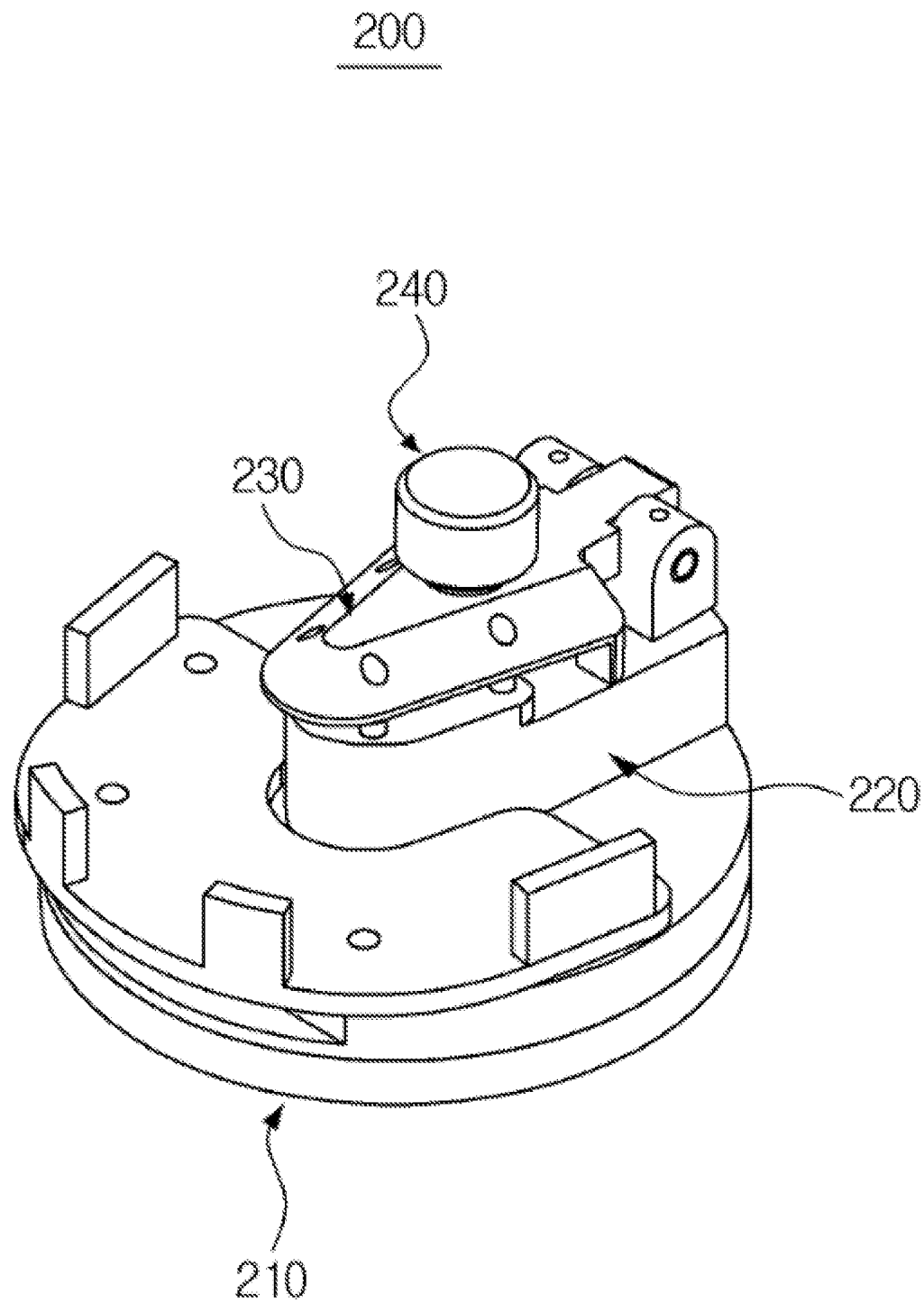
FIG. 6 is a perspective view of a jig device according to a second example of the invention.

However, the guide coupling portions are not necessarily limited thereto, as long as the guide coupling portions 122a to 122d have a mechanical structure that enables the surgical guide to be attached and detached. For example, the guide coupling portions 122a to 122d can be realized into a form in which predetermined fixing means is integrated thereto or can be realized into a protrusion as illustrated in FIG. 6 or the like to be described below.

As described in the illustration, the guide coupling portions 122a to 122d may include the first to fourth guide coupling portions 122a to 122d. The first to fourth guide coupling portions 122a to 122d may be disposed separately at predetermined positions and at predetermined intervals at the seating surface 121.

Here, the first to fourth guide coupling portions 122a to 122d can form a dispositional structure of a trapezoidal form on a plane. Otherwise, when the second to fourth guide coupling portions 122b to 122d are assumed to be sequentially disposed from the first guide coupling portion 122a as a starting point in a counterclockwise direction on a plane, a horizontal interval G1 between the second and third guide coupling portions 122b and 122c disposed at a front part of the seating surface 121 can be formed to be different from a horizontal interval G2 between the first and fourth guide coupling portions 122a and 122d disposed at a rear part of the seating surface 121.

That is, when the horizontal interval G1 between the second and third guide coupling portions 122b and 122c is referred to as a first interval G1, and the horizontal interval G2 between the first and fourth guide coupling portions 122a and 122d is referred to as a second interval G2, the first interval G1 may be formed to be different from the second interval G2. As described in the illustration, the first to fourth guide coupling portions 122a to 122d is disposed in the trapezoidal form on a plane, and the first interval G1 is formed to be smaller than the second interval G2.

The disposition of the first to fourth guide coupling portions 122a to 122d described above enables the surgical guide to be more effectively guided to the mounting position. In particular, a combination of the first to fourth guide coupling portions 122a to 122d to be fastened varies depending on a type of surgical guide, and thus a user can intuitionally find a correct mounting position depending on the type. This will be further described in connection with an operation of the invention.

Otherwise, the first to fourth guide coupling portions 122a to 122d may be disposed in a form corresponding to a shape of a dental arch, in addition to the trapezoidal disposition. For example, the first to fourth guide coupling portions 122a to 122d may be disposed in an elliptical form, a polygonal form, or the like corresponding to the shape of the dental arch.

On the other hand, the jig device 100 of this example may include a cover unit 130.

The cover unit 130 may fix and support the surgical guide between the fixing unit 120 and the cover unit. Specifically, the cover unit 130 may have a press surface 131 which is disposed to face the seating surface 121 of the fixing unit 120. The press surface 131 generally refers to an underside part of the cover unit 130. The surgical guide is disposed to be seated on the seating surface 121 of the fixing unit 120 and may be fixed and supported by the jig device 100 in a state where the press surface 131 of the cover unit 130 pressurizes the surgical guide.

The cover unit 130 may be disposed at a closed position at which the surgical guide is fixed and an opened position at which the surgical guide can be attached and detached.

FIG. 1 illustrates a state where the cover unit 130 is disposed at the closed position. In this case, the press surface 131 is disposed to face the seating surface 121, and the surgical guide can be fixed between the press surface and the seating surface. For reference, FIG. 1 or the like does not illustrate the surgical guide.

FIG. 2 illustrates a state where the cover unit 130 is disposed at the opened position. In this case, the press surface 131 is disposed to be separated from the seating surface 121, and the surgical guide can be detached from the seating surface 121. Otherwise, in this state, a new surgical guide can be mounted on the seating surface 121 again.

The cover unit 130 can be mounted at the fixing unit 120 or the base 110 so as to be capable of switching between the closed position and the opened position. As described in the illustration, the cover unit 130 can be rotatably fastened to a rear end of the fixing unit 120 via a hinge 134 and can switch to the closed or opened position as the cover unit rotates around the hinge 134.

The underside or the press surface 131 of the cover unit 130 may have cover coupling portions 132a to 132d corresponding to the above-described guide coupling portions 122a to 122d. The cover coupling portions 132a to 132d may be fastened to the guide coupling portions 122a to 122d and may aid supporting or fixing of the cover unit 130.

Similar to the guide coupling portions 122a to 122d, the cover coupling portions 132a to 132d may be formed to have a structure, a shape, or the like such as a hole, a groove, or a protrusion which can be mechanically coupled to the surgical guide. In the case of this example, the cover coupling portions 132a to 132d are illustrated in a form of a hole which penetrates the cover unit 130 in a thickness direction such that predetermined fixing means can be fastened thereto.

A plurality of cover coupling portions 132a to 132d may be provided to correspond to the guide coupling portions 122a to 122d. In the case of this example, a case where first to fourth cover coupling portions 132a to 132d are provided to correspond to the first to fourth guide coupling portions 122a to 122d is illustrated.

As necessary, the cover unit 130 may have a spacer 133. The spacer 133 enables a predetermined gap to be maintained between the press surface 131 and the seating surface 121.

As described in the illustration, a pair of right and left spacers 133 is disposed to project from an underside part of the cover unit 130 adjacent to the hinge 134. The spacer 133 formed as described above may come into contact with the top surface of the fixing unit 120 at one side when the cover unit 130 is disposed at the closed position, and thus the space enables a gap between the press surface 131 and the seating surface 121 to be maintained.

The operation of the jig device 100 described above is as follows.

First, the cover unit 130 is opened in a state illustrated in FIG. 2. Here, the base 110 is assumed to be mounted on the processing device such as the drilling machine for processing the surgical guide.

In a state where the cover unit 130 is opened, the surgical guide is seated on the seating surface 121. Here, the surgical guide includes a surgical guide which has an impression acquired in an oral cavity of a patient and is appropriately subjected to a hardening treatment of resin. For example, the surgical guide may include a surgical guide disclosed in Korean Patent Application No. 10-2019-0055759 (Patent Literature 1).

When the surgical guide is appropriately seated and fastened as described above, the cover unit 130 is closed in a state illustrated in FIG. 1, and the surgical guide can be strongly fixed between the fixing unit 120 and the cover unit 130. When the surgical guide is fixed as described above, the drilling machine or the like can appropriately perform machining of a guide hole or the like in the surgical guide. When the machining is completed, the cover unit 130 is opened in a state illustrated in FIG. 2, and then the surgical guide of which machining is completed can be taken out of the jig device 100.

A fastening or dispositional form of the surgical guide to the seating surface 121 can vary depending on the types of surgical guides.

FIG. 4 illustrates the types of surgical guides, and FIG. 5 illustrates fastening forms to the jig device depending on the types of surgical guides.

With reference to FIG. 4, a plurality of types of surgical guides may be provided depending on an operation site or the like. (a) in FIG. 4 illustrates an example of a first surgical guide S1 formed to be extended into a partial arch shape, and (b) in FIG. 4 illustrates an example of a second surgical guide S2 formed to be extended into a half arch shape. (c) in FIG. 4 illustrates an example of a third surgical guide S3 formed to be extended into a full arch shape, and (d) in FIG. 4 illustrates an example of a fourth surgical guide S4 having a linear shape.

With reference to FIG. 5, the first surgical guide S1 having the partial arch shape may have second and third fixing holes 11b and 11c, may be fastened to the second and third guide coupling portions 122b and 122c of the seating surface 121 which correspond to the second and third fixing holes 11b and 11c, and may be mounted and installed on the jig device 100. Intervals, positions, and the like of the second and third fixing holes 11b and 11c and the second and third guide coupling portions 122b and 122c coordinate with preset intervals, positions, and the like.

In a similar manner as described above, the second surgical guide S2 having the half arch shape may have first and second fixing holes 11a and 11b corresponding to the first and second guide coupling portions 122a and 122b and may be mounted and installed on the first and second guide coupling portions 122a and 122b. Otherwise, the second surgical guide S2 having the half arch shape may have third and fourth fixing holes 11c and 11d corresponding to the third and fourth guide coupling portions 122c and 122d and may be mounted and installed on the third and fourth guide coupling portions 122c and 122d. In addition, the third surgical guide S3 having the full arch shape may have first to fourth fixing holes 11a to 11d corresponding to the first to fourth guide coupling portions 122a to 122d, and the fourth surgical guide S4 having the linear shape can have the first and second fixing holes 11a and 11b or the third and fourth fixing holes 11c and 11d.

Each types of surgical guides S1 to S4 may be mounted and disposed on the seating surface 121 in such forms described above. Here, the first to fourth guide coupling portions 122a to 122d are disposed uniquely in a form similar to a trapezoidal form, thereby, enabling the surgical guides S1 to S4 to be guided to correct mounting positions by a user.

However, the surgical guides S1 to S4 in FIG. 4 are illustrated only as examples, and the above-described jig device 100 is applicable to any surgical guides without necessarily limiting the application thereto.

Figure 7:
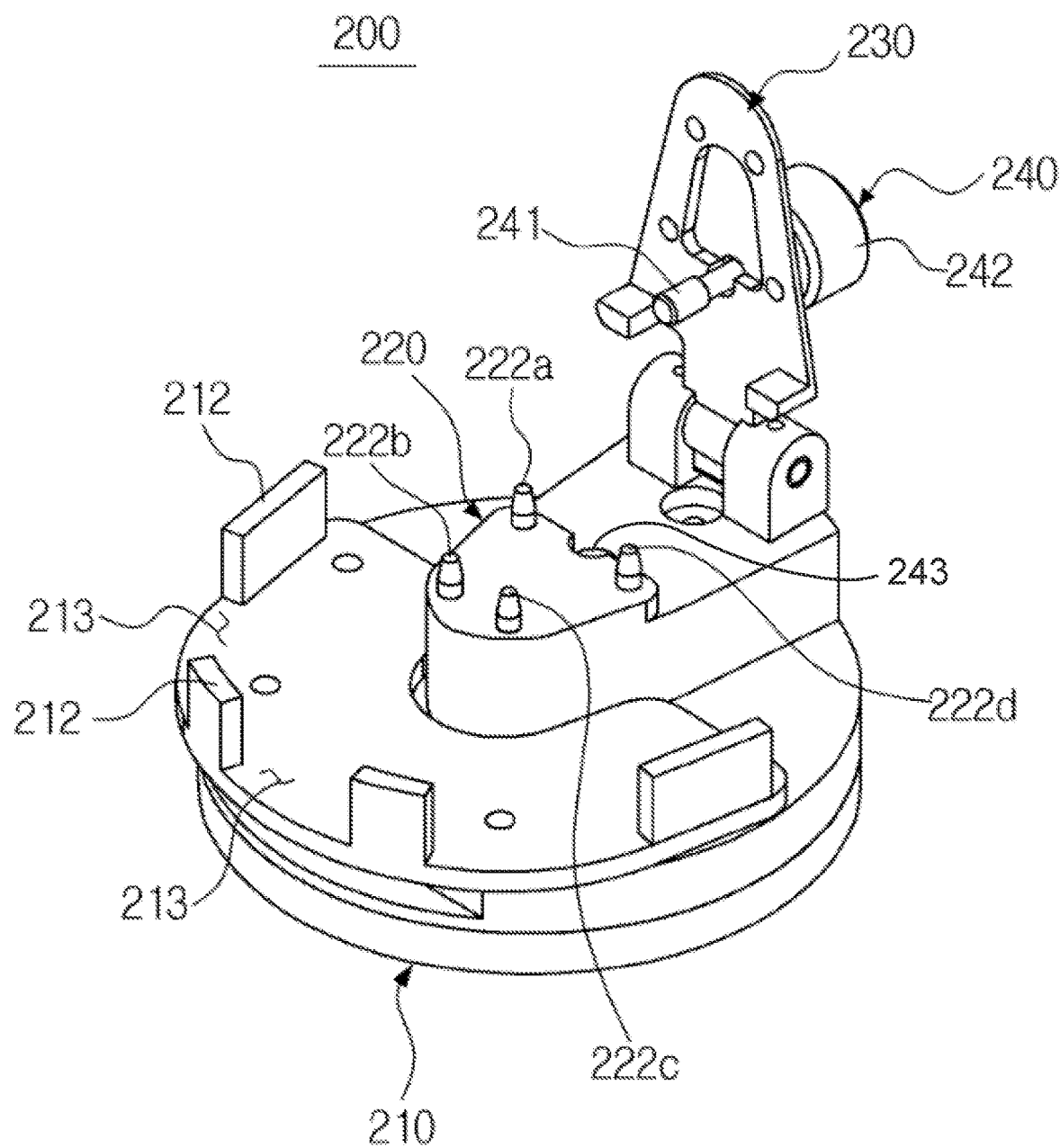
FIG. 7 is a perspective view illustrating an operation state of the jig device illustrated in FIG. 6.
Figure 8:
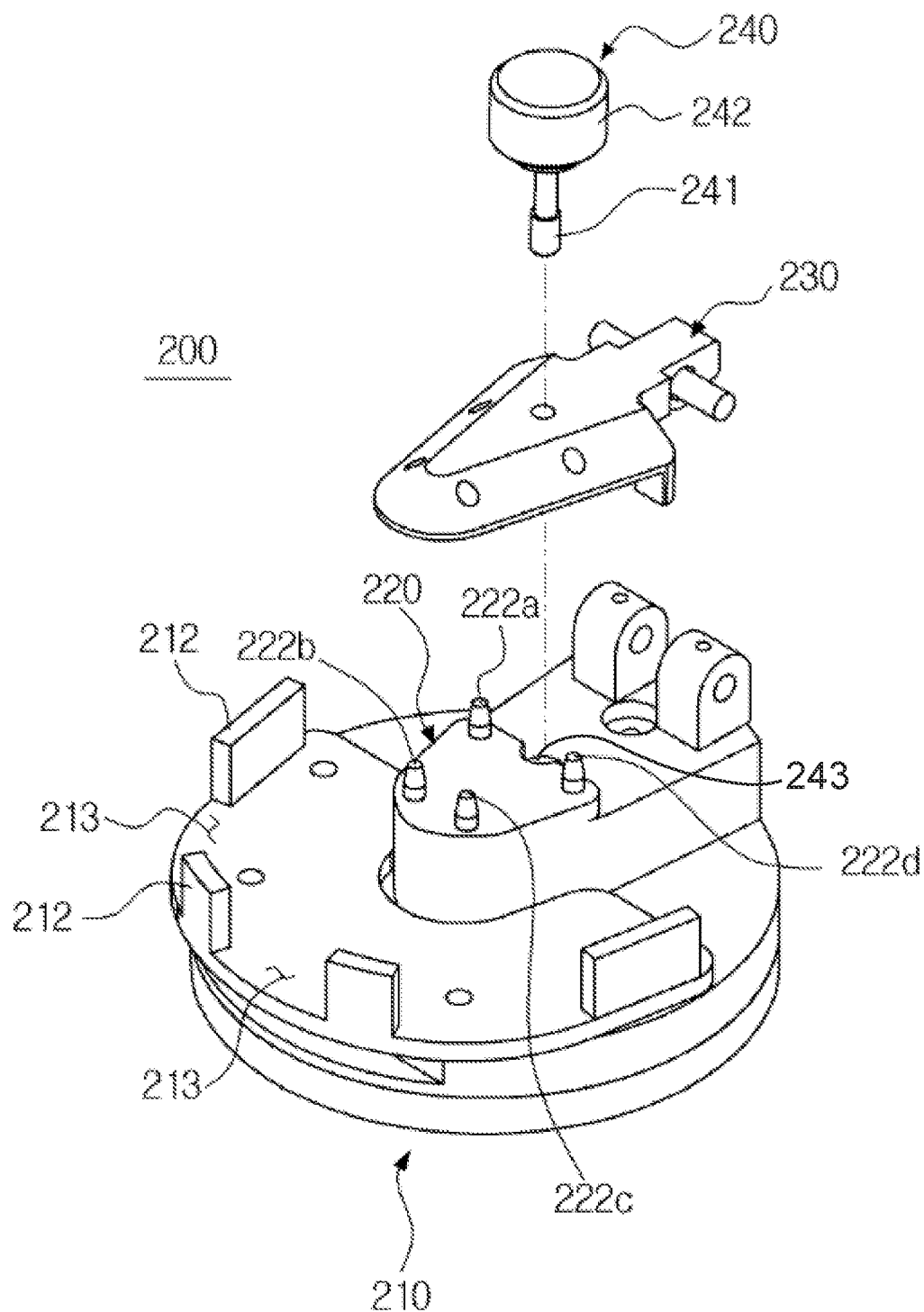
FIG. 8 is an exploded perspective view of the jig device illustrated in FIG. 6.

FIGS. 6 to 8 illustrate a jig device according to a second example of the invention.

Hereinafter, the same or similar configurations as or to those in the above-described example will not be described or will be briefly described.

With reference to FIGS. 6 to 8, a jig device 200 of this example may include a base 210.

The base 210 may provide a lower structure for mounting the surgical guide.

The base 210 of this example can have a support 212. The support 212 may be formed to be extended along an outer edge part of the base 210 by a predetermined length. In addition, the support 212 may be formed to project upward by a predetermined height.

A plurality of supports 212 may be provided. The plurality of supports 212 may have predetermined separating spaces 213 therebetween to be disposed separately along the outer edge part of the base 210. Hence, a top surface of the base 210 can have a structure in which the supports 212 and separating spaces 213 are alternately disposed along the outer edge part. According to the illustration, four supports 212 disposed as described above are illustrated.

Upper ends of the supports 212 described above may come into contact with an underside of the surgical guide and support the underside. As the surgical guide is supported by the supports 212 at an opposite side of a fixing unit 220, the surgical guide can be more stably and strongly mounted and supported on the jig device 200.

On the other hand, the jig device 200 of this example may include the fixing unit 220.

The fixing unit 220 may have a plurality of guide coupling portions 222a to 222d. In a case of this example, a case of providing four guide coupling portions 222a to 222d is illustrated.

The guide coupling portions 222a to 222d may have diverse variable shapes. For example, the guide coupling portions 222a to 222d may be formed as a circular or elliptical column or a polygonal column such as a triangular or quadrangular column. As necessary, the guide coupling portions 222a to 222d may be formed into a form of a cone, a poly-pyramid, or the like having a cross-section which gradually decreases toward an upper end thereof. This facilitates coupling of the surgical guide.

On the other hand, the jig device 200 of this example may include a cover unit 230.

The cover unit 230 may be formed in the same or similar manner as or to that in the above-described example.

On the other hand, the jig device 200 of this example may further include a pressurizing unit 240.

The pressurizing unit 240 may be formed to be fastened to the cover unit 230 so as to cause the fixing unit 220 to pressurize the cover unit 230. Consequently, the surgical guide between the cover unit 230 and the fixing unit 220 can be more strongly and stably fixed and supported.

The pressurizing unit 240 may be realized into a shape of bolt form having a helical portion 241 at one end thereof. A holding portion 242 which is held by a user or the like can be formed at an opposite side of the helical portion 241. The helical portion 241 penetrates the cover unit 230 to be screwed into a pressurizing-unit fastening hole 243 formed in the base 210. Accordingly, a rotating operation of the pressurizing unit 240 enables the cover unit 230 to be pressurized or unpressurized by the fixing unit 220.

Such an operation of the jig device 200 is similar to the operation in the above-described example except that only an operation of the pressurizing unit 240 is partially added, and thus a detailed description thereof is omitted.

Figure 9A:
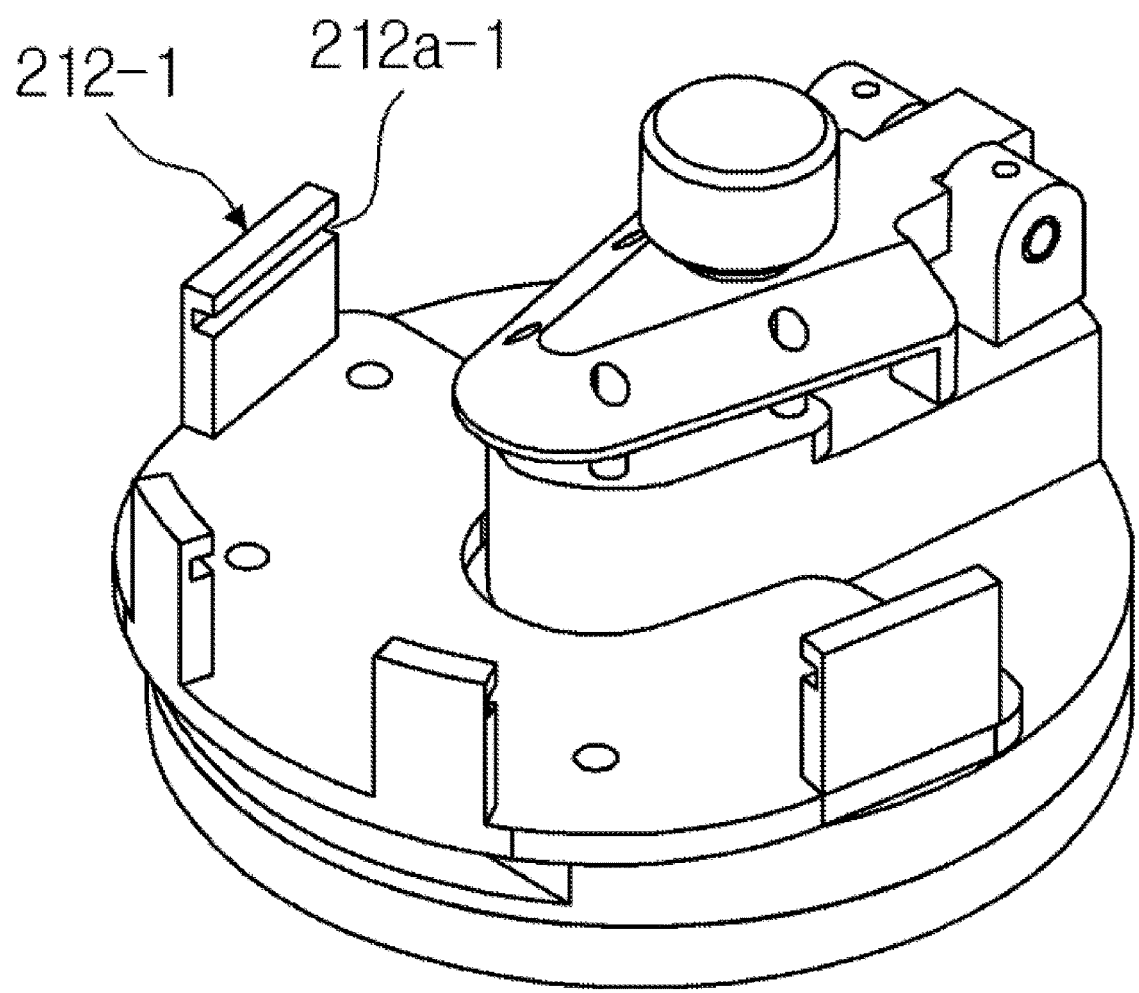
FIGS. 9A and 9B illustrate first and second modification examples of the jig device illustrated in FIG. 6.
Figure 9B:
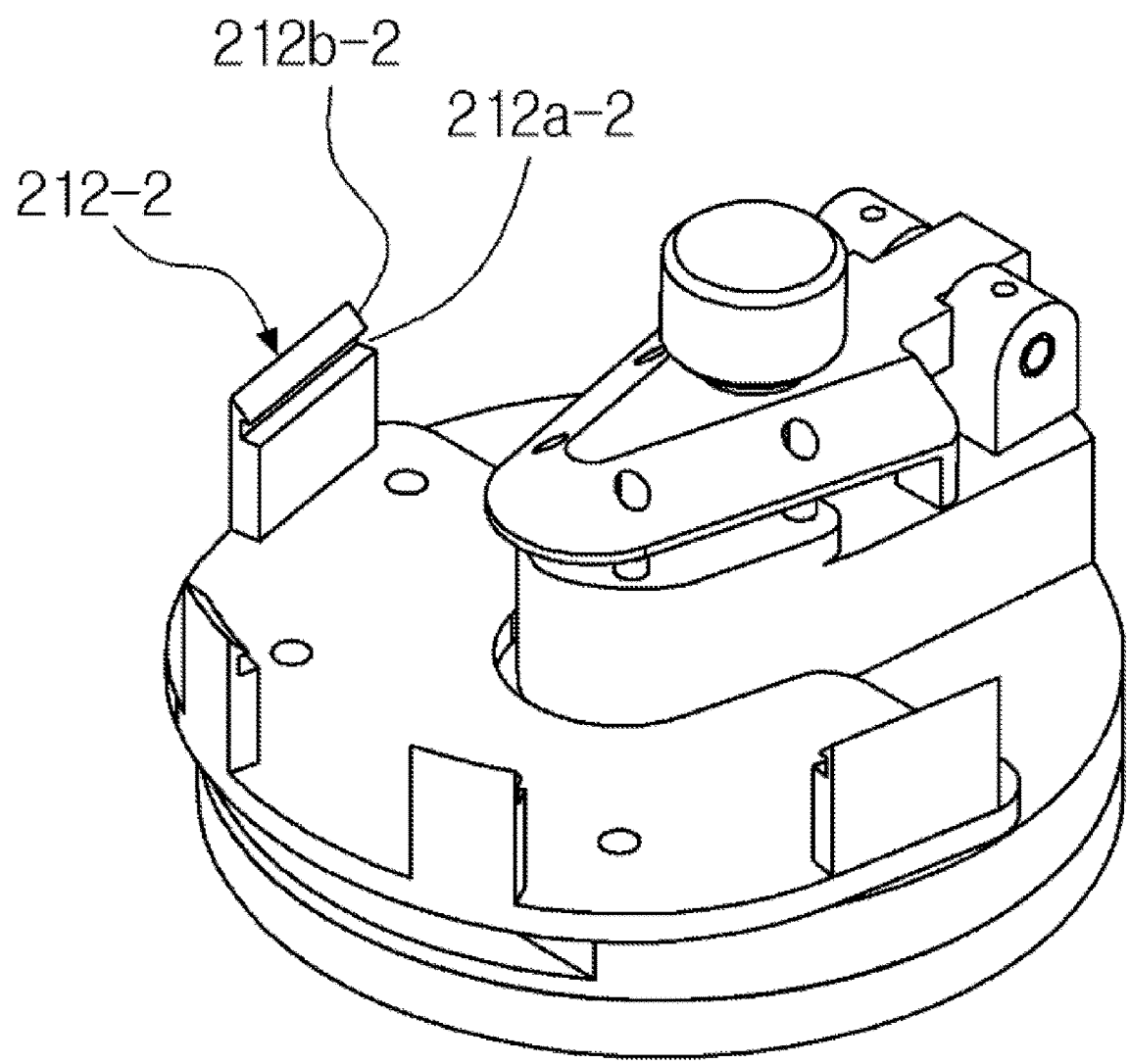

FIGS. 9A and 9B illustrate first and second modification examples of the jig device illustrated in FIG. 6.

In the modification examples illustrated in FIGS. 9A and 9B, a configuration of supports 212-1 and 212-2 is changed, and FIG. 9A illustrates the support 212-1 according to the first modification example. Here, the support 212-1 may have a groove 212a-1 at an upper end thereof. The groove 212a-1 may be formed to be extended in a transverse direction in one surface of the support 212-1, the surface facing the fixing unit 220. In this case, an outer edge, a flange, or the like of the surgical guide may be fastened into the groove 212a-1 and may be more stably fixed and supported to the support 212-1. In addition, the support 212-1 of the first modification example can have a function of being coupled to the surgical guide to fix the surgical guide. This is similarly applied to a case of supports 212-2, 212-3, and 212-4 according to second to fourth modification examples.

FIG. 9B illustrates the support 212-2 according to the second modification example. The support 212-2 is similar to a case in the first modification example, and an upper surface 212b-2 is formed to be inclined downward toward the fixing unit 220 at a central side. That is, the support 212-2 according to the second modification example may have the upper surface 212b-2 which is formed as an inclined surface. The inclined surface 212b-2 formed as described above guides the surgical guide to be more easily fastened into a groove 212a-2.

Figure 10A:
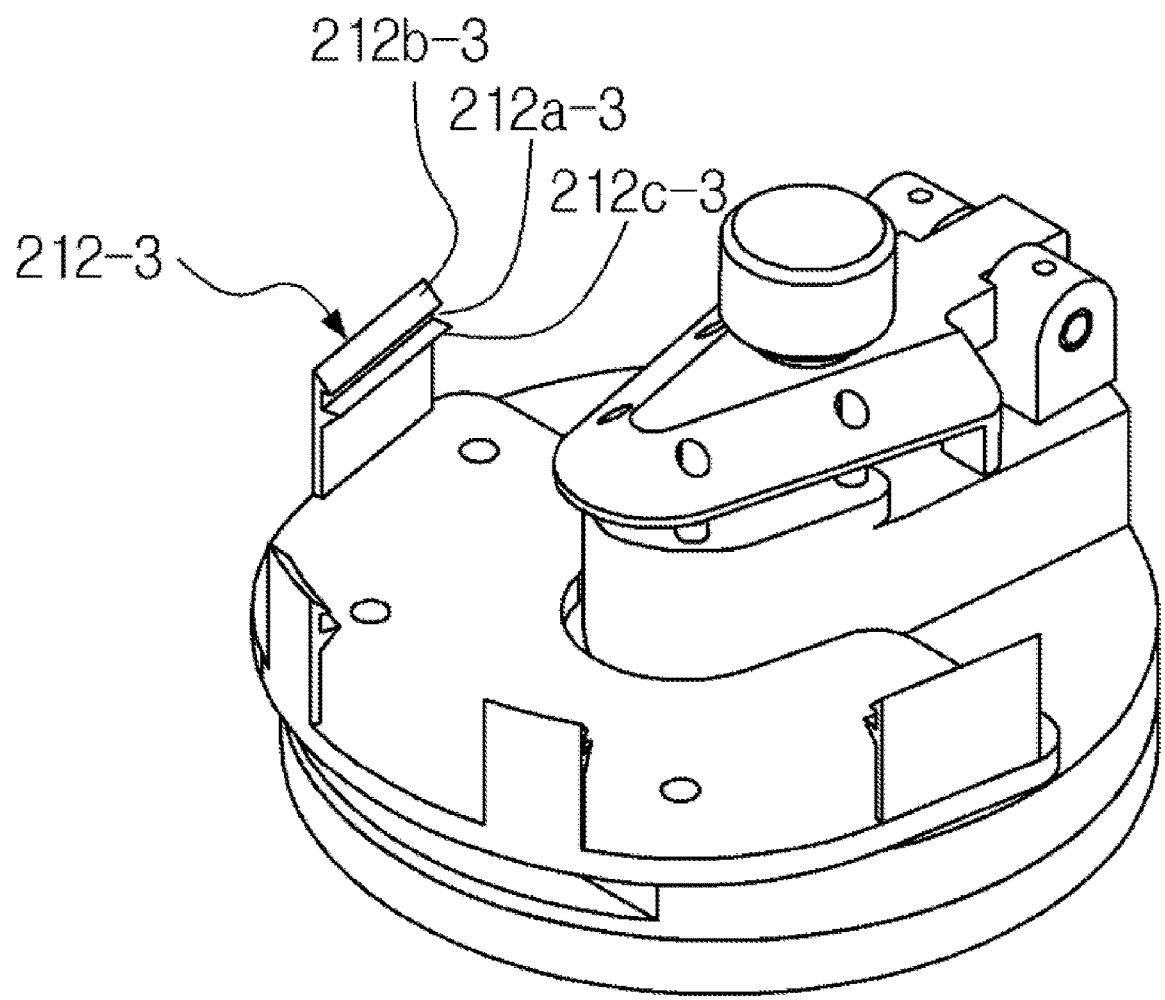
FIGS. 10A and 10B illustrate third and fourth modification examples of the jig device illustrated in FIG. 6.
Figure 10B:
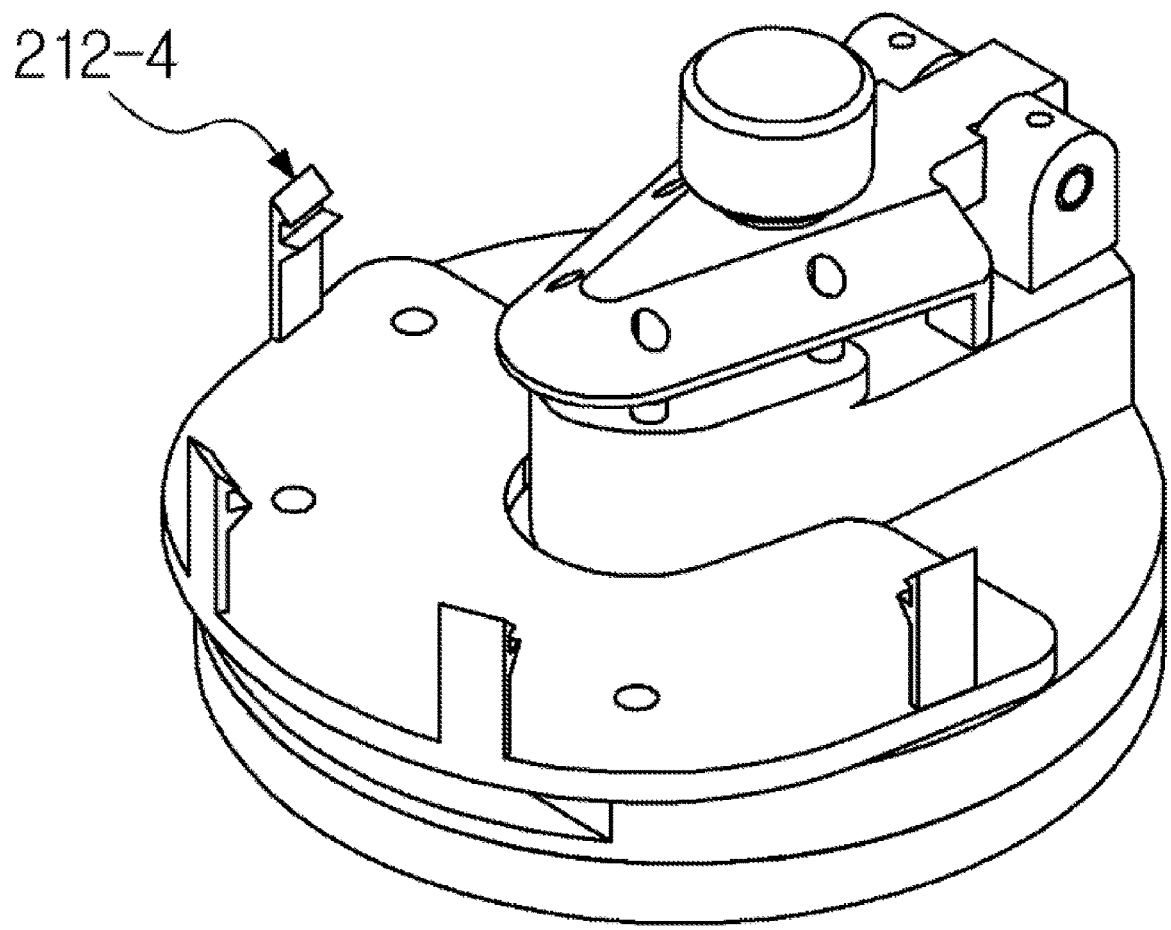

FIGS. 10A and 10B illustrate the third and fourth modification examples of the jig device illustrated in FIG. 6.

In the modification examples illustrated in FIGS. 10A and 10B, a configuration of supports 212-3 and 212-4 is changed, and FIG. 10A illustrates the support 212-3 according to the third modification example. The support 212-3 has a groove 212a-3 at an upper end thereof, and an upper surface 212b-3 and a lower surface 212c-3 may be formed as inclined surfaces corresponding to each other with the groove 212a-3 as the center.

FIG. 10B illustrates the support 212-4 according to the fourth modification example, and the support 212-4 is formed to have a narrow width in a transverse direction. In this case, a part or an entirety of the support 212-4 may contain an elastic material and may be elastically deformed by a predetermined extent as the surgical guide is attached and detached. Accordingly, the support 212-4 aids fixing of the surgical guide and enables the surgical guide to be more easily attached and detached.

Figure 11:
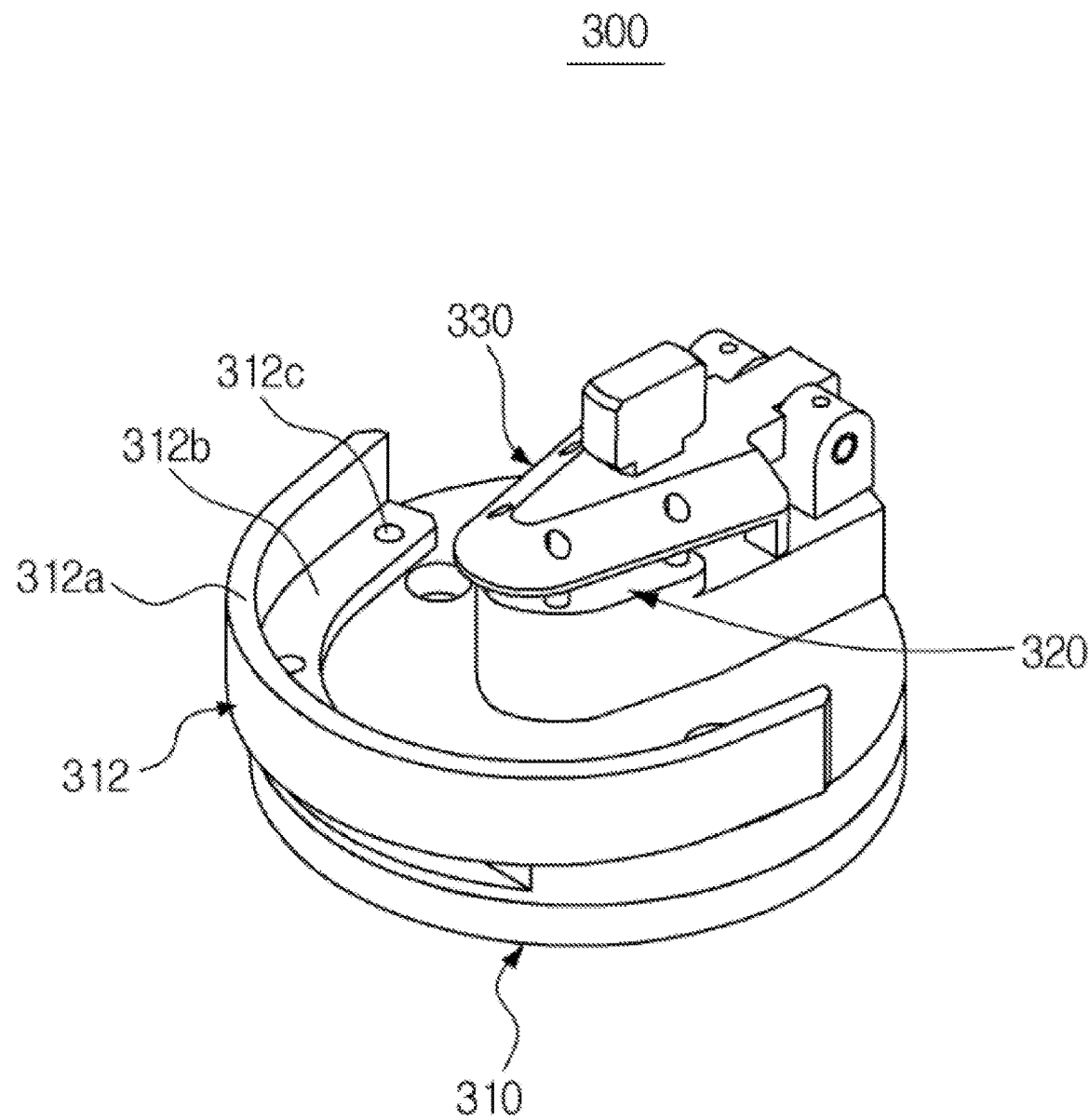
FIG. 11 is a perspective view of a jig device according to a third example of the invention.

FIG. 11 is a perspective view of a jig device according to a third example of the invention.

With reference to FIG. 11, a jig device 300 of this example may include a base 310, a fixing unit 320, and a cover unit 330.

The fixing unit 320 and the cover unit 330 may be formed in the same or similar manner as or to that in the above-described examples.

The base 310 corresponds to the bases 110 and 210 in the above-described examples.

Here, the base 310 of this example may include a support bracket 312. The support bracket 312 may functionally correspond to the support 212 in the above-described examples.

The support bracket 312 may be integrally formed to the base 310 or may be realized to be formed separately from the base 310 to be detachable to and attachable from the base 310. In a case of this example, the support bracket 312 having a predetermined shape is realized to be attachable to and detachable from the base 310.

The support bracket 312 may be formed to be extended in an arc form on a plane. Otherwise, the support bracket 312 may be vertically extended by a predetermined height to have a support end 312a, and the support end 312a may be formed to be extended into an arc form on a plane. The support end 312a has such a shape so as to provide a support structure which is effective for diverse types of surgical guides, with consideration for the surgical guides. The support end 312a supports the surgical guide to be subjected to processing.

As described in the illustration, when the support bracket 312 is realized as a separate member from the base 310, a coupling rib 312*b* may be provided at a lower end of the support bracket 312. The coupling rib 312*b* may have one or more fixing holes 312*c* and may be strongly fixed and installed at a top surface of the base 310.

In such a case described above, the support bracket 312 may be attached to and detached from the base 310 as necessary. For example, the support bracket 312 may be attached and detached or an appropriate support bracket 312 may be selected to be mounted, depending on a type, a processing condition, or the like of surgical guide.

Figure 12A:
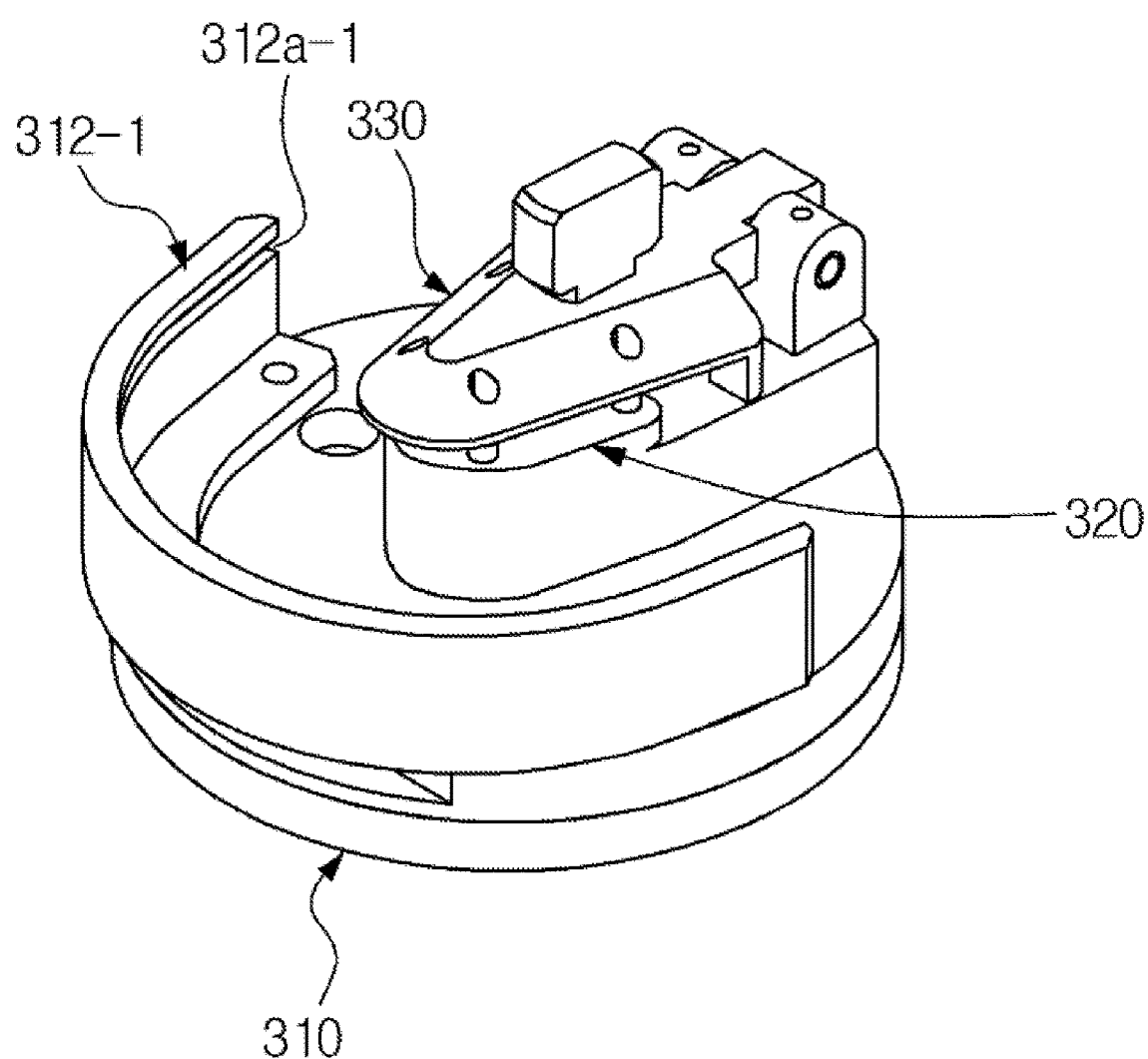
FIGS. 12A to 12C illustrate first to third modification examples of the jig device illustrated in FIG. 11.

FIG. 12A illustrates a first modification example of the jig device illustrated in FIG. 11.

In the modification example illustrated in FIG. 12A, a configuration of a support bracket 312-1 is changed, and the support bracket 312-1 may have a groove 312*a*-1 at an upper end thereof. The groove 312*a*-1 may be formed to be extended in a transverse direction to form an arc shape in one surface of the support bracket 312-1, the surface facing the fixing unit 320. In this case, an outer edge, a flange, or the like of the surgical guide may be fastened into the groove 312*a*-1 and may be more stably fixed and supported to the support bracket 312-1.

Figure 12B:
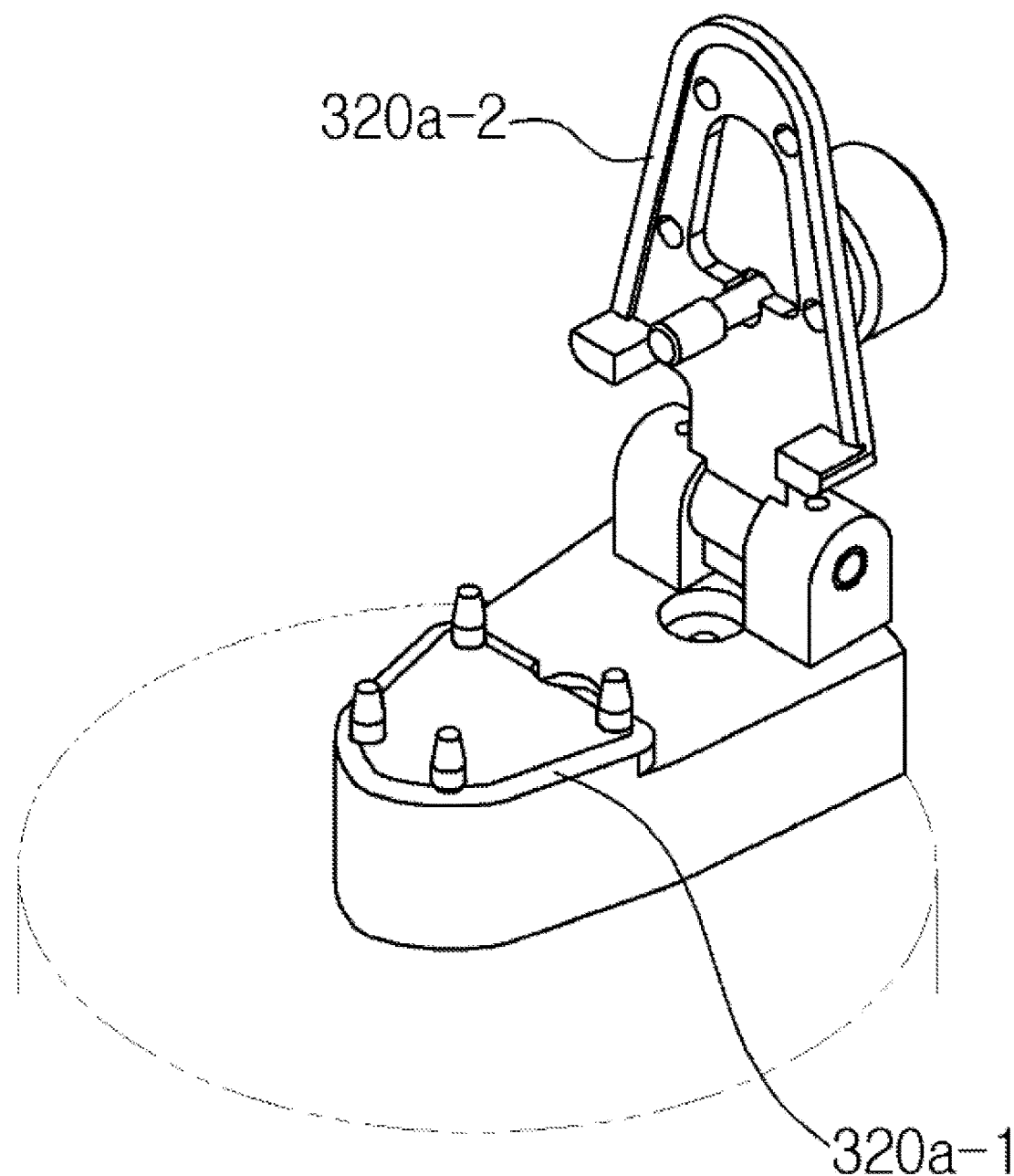

FIG. 12B illustrates a second modification example of the jig device illustrated in FIG. 11.

In the modification example illustrated in FIG. 12B, configurations of the fixing unit 320 and the cover unit 330 partially are changed, and a chamfer 320*a*-1 is formed at an edge part of the fixing unit 320.

In addition, a press portion 320*a*-2 may be formed at an edge part of an underside of the cover unit 330. The press portion 320*a*-2 may be extended to have a strip form along the edge part and may be formed to project to have a predetermined height (step). A shape of the press portion 320*a*-2 generally corresponds to a shape of the edge part of the fixing unit 320. The press portion 320*a*-2 formed as described above may come into pressurizing contact with a top surface of the surgical guide and may further improve a fixing force of the surgical guide.

Figure 12C:
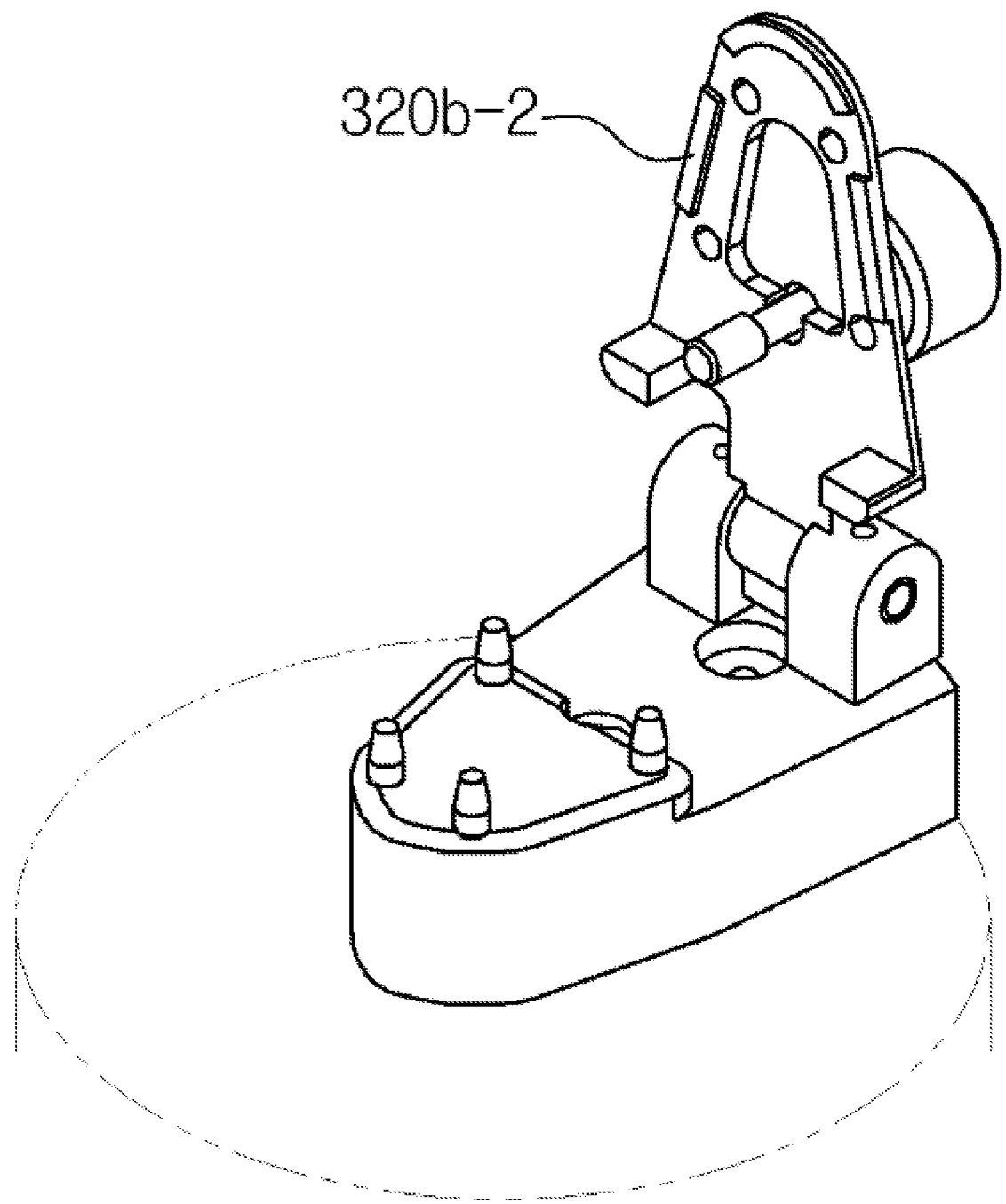

FIG. 12C illustrates a third modification example of the jig device illustrated in FIG. 11.

In the modification example illustrated in FIG. 12C, a shape of the press portion 320*b*-2 is different from that in the above-described modification example.

According to this modification example, the press portion 320*b*-2 is extended along the edge part of the underside of the cover unit 330 and has a partially disconnected zone. Hence, three strip shapes are formed to project from the underside of the cover unit 330 and form the press portion 320*b*-2.

As described above, the jig devices according to the examples of the invention enable the surgical guide having an impression acquired in an oral cavity of a patient to be mounted on the drilling machine or the like for performing the guide hole machining.

Here, the jig devices according to the examples of the invention have a unique structural shape, thereby, making it possible to mount and support the plurality of types of surgical guides.

In addition, the jig devices according to the examples of the invention include the fixing unit and the cover unit which have respective unique structures, thereby, making it easy to attach and detach the surgical guide and making it possible to strongly fix and support the surgical guide during processing.

In addition, the jig devices according to the examples of the invention have the guide coupling portion which is uniquely disposed, thereby, making it possible to identify and guide the surgical guide to the correct mounting position. In some cases, the jig devices can be used as devices that discriminate between types of mounted surgical guides.

Jig devices according to examples of the invention enable a surgical guide having an impression acquired in an oral cavity of a patient to be mounted on a drilling machine or the like for performing guide hole processing.

Here, the jig devices according to the examples of the invention have a unique structural shape, thereby, making it possible to mount and support a plurality of types of surgical guides.

In addition, the jig devices according to the examples of the invention include a fixing unit and a cover unit which have respective unique structures, thereby, making it easy to attach and detach the surgical guide and making it possible to strongly fix and support the surgical guide during processing.

In addition, the jig devices according to the examples of the invention have a guide coupling portion which is uniquely disposed, thereby, making it possible to identify and guide the surgical guide to the correct mounting position. In some cases, the jig devices can be used as devices that discriminates between types of mounted surgical guides.

As described above, the examples of the invention are described; however, it is possible for a person of ordinary knowledge in the technical field to variously modify and alter the invention by adding, modifying, removing, or supplementing a configurational element within a range without departing from ideas of the invention described in claims, and this modification and alteration are also said to be included in the scope of a right of the invention.

While the present invention has been described with respect to the specific embodiments, it will be apparent to those skilled in the art that various changes and modifications may be made without departing from the spirit and scope of the invention as defined in the following claims.

What is claimed is:

1. A jig device for processing of a dental implant surgical guide, comprising:
 a base at which a surgical guide having an impression acquired in an oral cavity of a patient is disposed;
 a fixing unit which is provided at the base and at which the surgical guide is seated, the fixing unit comprising at least one guide coupling portion; and
 a cover unit comprising a press surface which fixes one side of the surgical guide between the fixing unit and the cover unit and the cover unit is formed to be openable and closeable so as to fix and/or unfix the surgical guide, wherein the press surface has at least one cover coupling portion which is formed to correspond to and mate with the at least one guide coupling portion of the fixing unit.

2. The jig device for processing of a dental implant surgical guide according to claim 1,
 wherein the base is mounted on a processing device that drills a guide hole in the surgical guide.

3. The jig device for processing of a dental implant surgical guide according to claim 1,
 wherein the base includes a plurality of supports that are disposed separately in a circumferential direction of the base and support the surgical guide.

4. The jig device for processing of a dental implant surgical guide according to claim 3, wherein each of the supports projects upward from the base by a predetermined height and is formed to be extended by a predetermined length along an outer edge of the base.

5. The jig device for processing of a dental implant surgical guide according to claim 3,
wherein at least one of the plurality of supports has a groove at one surface facing the fixing unit, and
wherein the groove is formed to be extended in a transverse direction at the one surface and is formed to be coupled to one side of the surgical guide.

6. The jig device for processing of a dental implant surgical guide according to claim 3,
wherein at least one of the plurality of supports has a groove which is formed to be extended in a transverse direction at one surface facing the fixing unit, and at least one of an upper surface and/or a lower surface is formed as an inclined surface with the groove as a center.

7. The jig device for processing of a dental implant surgical guide according to claim 1,
wherein the base includes a support bracket formed to be attachable to and detachable from an upper surface of the base, and
wherein the support bracket is formed to be extended into an arc shape on a plane and supports the surgical guide.

8. The jig device for processing of a dental implant surgical guide according to claim 1,
wherein the fixing unit has a seating surface at which the surgical guide is disposed to be seated, and
wherein the seating surface has the at least one guide coupling portion, and wherein the at least one guide coupling portion is a plurality of guide coupling portions which guide the surgical guide to a fastening position and/or in a fastening direction.

9. The jig device for processing of a dental implant surgical guide according to claim 8,
wherein the plurality of guide coupling portions include first to fourth guide coupling portions, and
wherein the first to fourth guide coupling portions are disposed in a trapezoidal form on a plane.

10. The jig device for processing of a dental implant surgical guide according to claim 8,
wherein the plurality of guide coupling portions are disposed in a form corresponding to a shape of a dental arch.

11. The jig device for processing of a dental implant surgical guide according to claim 8,
wherein the plurality of guide coupling portions include first to fourth guide coupling portions,
wherein the first guide coupling portion is disposed separately from the fourth guide coupling portion at a second interval in a horizontal direction to correspond to the fourth guide coupling portion,
wherein the second guide coupling portion is disposed separately from the third guide coupling portion at a first interval in a horizontal direction to correspond to the third guide coupling portion, and
wherein the first interval is formed to be different from the second interval.

12. The jig device for processing of a dental implant surgical guide according to claim 8,
wherein the surgical guide is configured of a plurality of types, and
wherein some selected guide coupling portions or all of the plurality of guide coupling portions are fastened to the surgical guide depending on a type of surgical guide.

13. The jig device for processing of a dental implant surgical guide according to claim 1,
wherein the cover unit includes a hinge to be fastened to the base so as to be rotatable.

14. The jig device for processing of a dental implant surgical guide according to claim 13,
wherein the cover unit has spacers which are formed to project from an underside so as to be adjacent to the hinge, and
wherein the spacers are provided at a pair of right and left positions and support the cover unit such that the cover unit has a predetermined gap from the fixing unit when the cover unit is closed.

15. The jig device for processing of a dental implant surgical guide according to claim 1,
wherein the cover unit has a press portion which is formed to be extended along an edge part of the underside of the cover unit so as to correspond to an edge part of the fixing unit and comes into pressurizing contact with the surgical guide when the cover unit is closed.

16. The jig device for processing of a dental implant surgical guide according to claim 1, further comprising:
a pressurizing unit that is fastened to the cover unit and enables the cover unit to be pressurized and/or unpressurized in a closed state of the cover unit.

17. The jig device for processing of a dental implant surgical guide according to claim 16,
wherein the pressurizing unit has
a helical portion which penetrates the cover unit to be screwed into a pressurizing-unit fastening hole at one side of the base, and
a holding portion which is disposed to be exposed at an end portion opposite to the helical portion.

* * * * *